United States Patent [19]

Larson et al.

[11] 4,318,682

[45] Mar. 9, 1982

[54] PRESS LOCKING APPARATUS

[75] Inventors: Frederick R. Larson; Rodger L. Dangremond, both of Holland; Donald L. Reuschel, Hamilton; James I. Moore, Zeeland, all of Mich.

[73] Assignee: Ex-Cell-O Corporation, Troy, Mich.

[21] Appl. No.: 184,519

[22] Filed: Sep. 5, 1980

[51] Int. Cl.³ ............................................. B30B 15/00
[52] U.S. Cl. .................. 425/411; 425/451.9; 425/595; 425/47
[58] Field of Search ............... 425/26, 47, 78, 252, 425/450.1, 451.2, 411, 451.9, 595

[56] References Cited

U.S. PATENT DOCUMENTS

| | | | |
|---|---|---|---|
| 2,689,978 | 9/1954 | Roger | 425/451.2 |
| 3,492,696 | 2/1970 | Haller | 425/78 |
| 3,590,437 | 7/1971 | Annis et al. | 425/451.2 X |
| 3,599,289 | 8/1971 | Girola | 425/451.2 X |
| 3,669,599 | 6/1972 | Snider et al. | 425/595 |
| 3,729,283 | 4/1973 | Eggenberger et al. | 425/595 X |
| 3,801,256 | 4/1974 | Farrell | 425/595 X |
| 3,951,579 | 4/1976 | Myers et al. | 425/450.1 X |
| 4,106,885 | 8/1978 | Poncet | 425/451.2 X |

*Primary Examiner*—J. Howard Flint, Jr.
*Attorney, Agent, or Firm*—Frank D. Risko; John C. Evans

[57] ABSTRACT

A hydraulic press having upper and lower hydraulically operated plates whereby the upper plate is movable with a long stroke cylinder and the lower plate is movable wth a short stroke cylinder. The press has a grooved load bearing rod which is attached to the upper moving plate and passes through the upper fixed plate of the press with a series of slots machined in the rod. A split ring and an especially ground shim are located on a bushing in the upper plate and in one of the ground grooves. A locking plate is attached to the lower part of the upper fixed plate and using a hydraulically operated cylinder has locking plates which move into and out of engagement with the grooved rod to accurately locate the position of the upper moving plate when the machine is stroked. This method of adjusting the horizontal position or parallelism of the plates enable very accurate positioning of the mold or dies which are mounted between the plates of the press.

4 Claims, 5 Drawing Figures

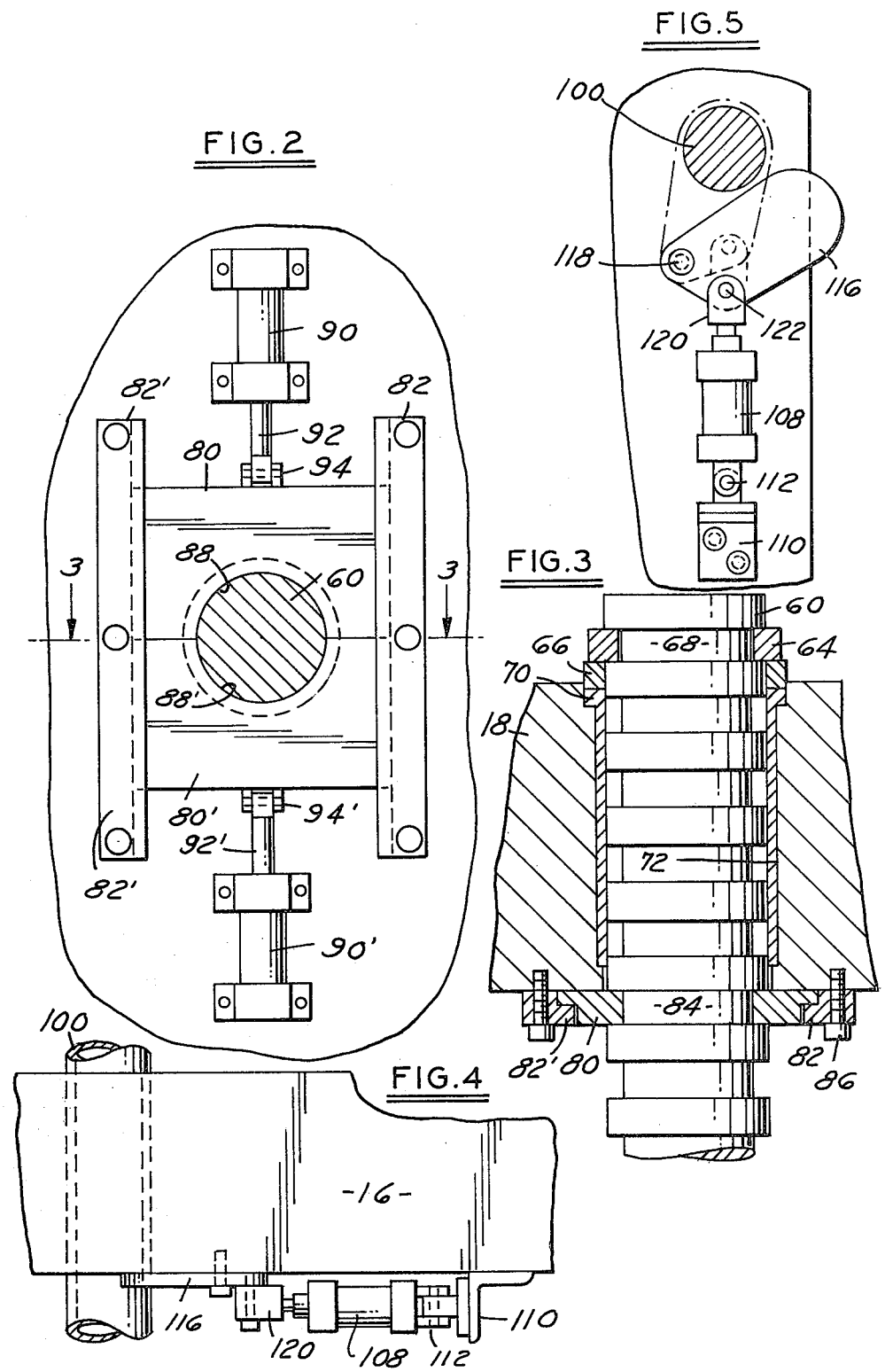

PRESS LOCKING APPARATUS

BACKGROUND OF INVENTION

This invention relates to press apparatus and, more particularly, provides an arrangement to improve the parallelism between the plates of a press and to improve the positioning of the mechanical locking mechanism.

The basic hydraulic press for the molding of SMC consists of two fixed platens or plates, and either one or two moving platens or plates, retained by tie bars or columns and a nut in combination therewith. The frame of the machine which rests on the floor can either support the columns and one of the fixed plates or can support both of the fixed plates and none of the columns if it is in a horizontal type press. For the sake of discussion and this patent, the discussion will be limited to a vertical type press and its mode of operation. Further, the press can have a single moving plate or in the case herein have two moving plates. Depending on the type of press that is involved, the means for adjusting the plates is generally restricted to adjustment of the column or tie bar nuts which fasten the fixed plates in their respective positions in the machine. Since the moving plates are attached to the fixed plates, the adjustment of the moving plate is subsequently achieved. If the plates of the machine are out of square, an adjustment can be made to any one of the four tie bar nuts to properly adjust the machine and establish the squareness of the moving plate. The initial squareness of the fixed plates of the machine establish the mechanical tolerances that stack up between the fixed plate, the cylinders operating the moving plate and the moving plate itself. These dimensions will then determine the ultimate tolerances and parallelism between the moving plates or the mold or die that is in the press. This becomes especially critical when one of the fixed plates is power driven to change the die height or closed height of the press as shown in the U.S. Patent to Haller, No. 3,492,696.

The present SMC type presses utilize a large bore, long stroke hydraulic cylinder for moving the lower or upper plate to achieve the desired clamping tonnage. These type cylinders require a large volume of oil in order to function properly.

Our invention overcomes this mechanical inaccuracy between the fixed and moving plates by mounting four additional rods to the upper moving plate of a vertical press. These rods are grooved so that a split ring collar can be inserted in one of the grooves around the rod. A second groove on a lower part of the rod, as it passes through the upper fixed plate, has its grooved slot aligned with a locking means which is hydraulically operated. A spacer shim is accurately machined so that once the locking position of the upper moving platen is determined, the four shims are properly ground so that the machine when stoked will always return to that same position. The shims thus adjust for the tolerances in the various parts of the machine to attain a maximum out of parallel condition of 0.002 inches and hence achieve the desired squareness.

An object of this invention is to maintain the parallelism of the upper moving plate of a press with the lower moving plate. An object of this invention is to have a series of slots in the guide rod so the adjustment of the die height can be easily changed.

An object of this invention is to utilize a means for holding the upper moving plate parallel with the fixed lower plate. An object of this invention is to prevent interference during engagement and disengagement of the locking mechanism. An object of this invention is to utilize short stroke, large bore cylinders to achieve the clamping tonnage. Further objects and purposes appear in the specification and claims.

DESCRIPTION OF DRAWINGS

FIG. 2 is a cross-section of the guide bar along line 2—2 in FIG. 1.

FIG. 3 is a cross-section of the guide bar, shim and locking plate taken along line 3—3 in FIG. 2.

FIG. 4 is a side elevation of the safety rod mechanism taken along line 4—4 in FIG. 1.

FIG. 5 is a view of the blocking mechanism taken along line 5—5 in FIG. 1.

DESCRIPTION

Figure 1:
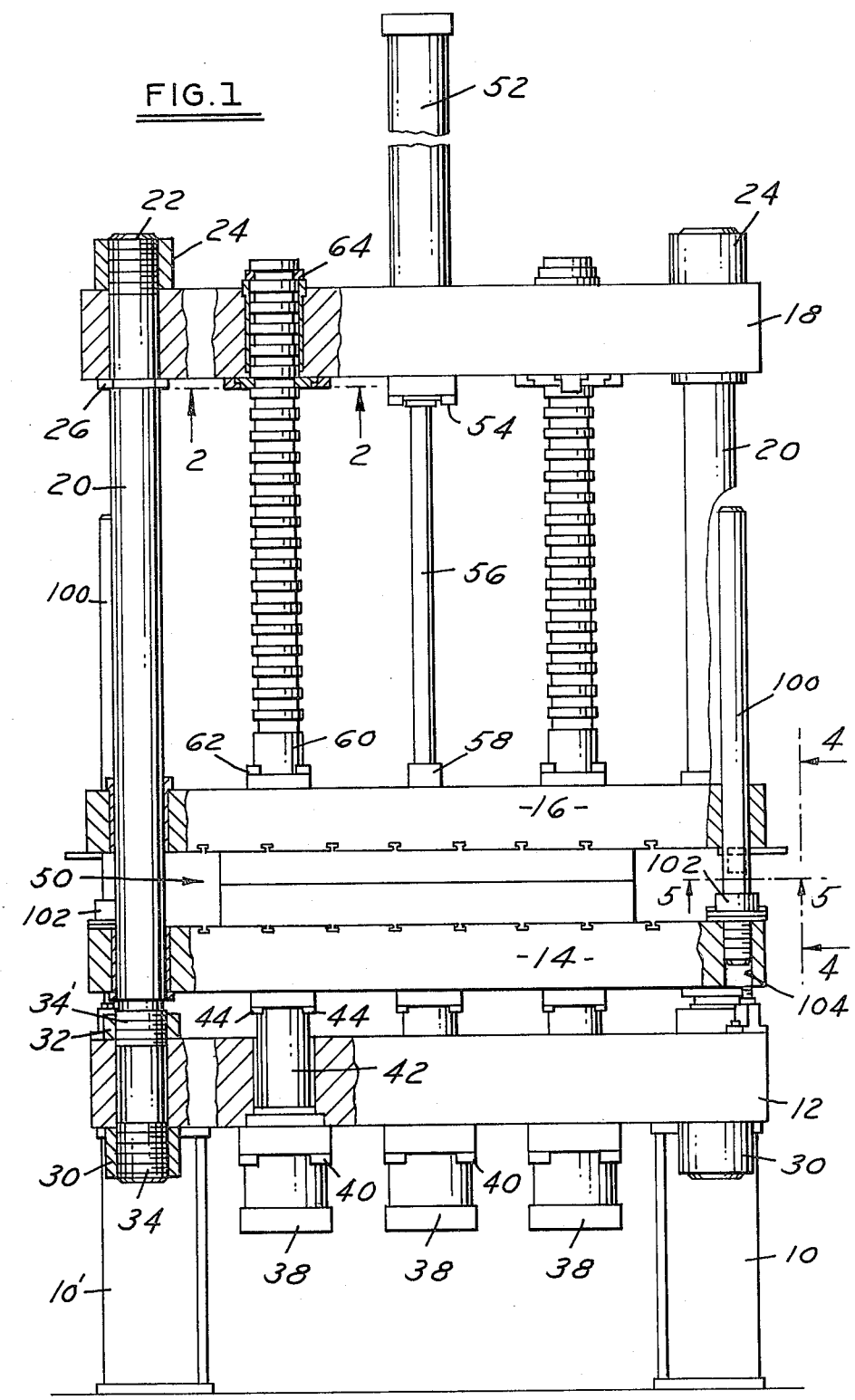
FIG. 1 is a front elevation view of the press apparatus in accordance with this invention.

In FIG. 1 an elevation of the press shows a four plate machine having a base, two fixed plates and two movable plates. The base members 10 and 10' support the lower fixed plate 12 which is mounted thereon. The lower moving plate 14 supports half of the mold assembly 50 which is attached to the T-slots shown in FIG. 1. Upper moving plate 16 and upper fixed plate 18 are held in a spacial relationship on the columns or tie bars 20. Attached to plate 16 is the other half of mold assembly 50.

The upper fixed plate 18 is held in position on the four tie bars 20 by upper tie bar nut 24 on threads 22 and by split ring 26 which holds the upper plate in a fixed position. The lower tie bar nut 30 is threaded to the tie bar 20 via threads 34 and bears on the lower side of lower fixed plate 12. A locking nut 32 holds the lower plate 12 in position and is threaded on to the tie bar 20 on threads 34'. Only a single tie bar is shown in section in FIG. 1 but it is apparent that the other 3 tie bars are held in the same manner. The lower cylinder 38 is affixed to the lower plate 12 by bolts 40. The lower cylinder rod 42 is bolted to the lower moving plate 14 by bolts 44. In the embodiment shown there are four cylinders equally spaced with an additional cylinder at the geometric center of the lower plate. The number of cylinders would be determined by the tonnage of the machine.

The upper cylinder 52 is bolted to the upper fixed plate 18 by bolts 54. The upper cylinder rod is connected to the upper moving plate by a threaded connection to extention 58 on plate 16. The upper cylinder rod, as can be seen in FIG. 1, is also called the long stroke cylinder because it moves the greater distance to allow the product to be removed from the mold means 50 after cycling. The lower cylinders 38 are moved a relatively short distance usually in the range of 4 inches and these apply the main tonnage that is developed in the machine.

Attached to the upper moving plate 16 is the grooved load bearing rod 60 which is attached to the plate 16 by bolts 62. The rod has a series of precision ground and parallel grooves the full length of the rod at predetermined increments. This rod is passed through the upper fixed plate and is shown best in FIG. 3. Here, a downstroke stop ring 64 is shown mounted to the top most groove or slot 68 of the load bearing rod 60. An adjustment shim 66 is located in contact with a bushing 70 which is mounted in bore 72. The guide bushing 70 is accurately positioned in the upper fixed plate 18. A locking plate 80 is shown engaging slot 84 of rod 60 and this locking plate is held in position against the lower surface of plate 18 by locking plate guides 82 and 82' which are affixed to plate 18 by screw 86. The FIG. 2 shows a view of the two locking plates 80 and 80' and the locking plate cylinder means 90 and 90' connected to the respective locking plates. The cylinder rod 92 is attached by a pin 94 to the locking plate 80 and likewise rod 92' is attached to locking plate 80' via pin 94'. It can be seen that these cylinders, when operated, will slide to engage or disengage the respective locking plates from the slot 84 in rod 60 and a small lead or chamfer is provided on arcuate surfaces 88 and 88'. It should be noted that in viewing FIG. 3, the mechanical dimension of shim 66 is adjusted for each of the load bearing rods that are attached to the upper moving plate 16. After the machine is assembled, a dimension check is made to determine the exact thickness which is required for a given shim. This shim is then always kept with the particular rod in the assembly in that place on the machine. The adjustment of this shim allows for all of the tolerances and the stack ups of the dimensions to be eliminated so that the distances between the downstroke stop ring 64 and the locking plate 80 is very accurately aligned. It should be pointed out that the downstroke stop 64 is actually a split ring which is attached to the particular slot. This establishes the lowest stroke to which the machine will stroke. In FIG. 3 the ring 64 is shown attached to the particular slot which will give the longest stroke of the machine. Obviously the ring can be moved into any of the slots in rod 60 depending upon the desired die height. The lower plate 14 would stroke from 1 to 4 inches and would automatically compensate for the changed die height.

An additional feature shown in this machine is a safety rod 100 shown in FIG. 1 which is connected to the lower moving plate 14 via fastener 102. This fastener and adjusting nut will fix the position of the safety rod 100. Clearance hole 104 mates with a hole in the lower plate to allow for rod 100 to be adjusted for different height molds. Viewing FIGS. 4 and 5, it can be seen that the locking cylinder 108 is mounted to the bracket 110 via a pivot pin 112. At the rod end of the cylinder is mounted clevis 120 and it is pinned to the blocking plate 116 via pivot pin 122. The blocking plate will pivot on the plate pivot 118. As can be seen after the rod 110 is cleared from the upper moving plate when the press is opened, cylinder 108 will be energized and will move to the phantom position shown in FIG. 5. In the event of a hydraulic failure the safety rods would hold the upper section of the press or the upper moving plate from falling to its lower most position. There are two such safety rods mounted on the machine shown.

Operation

The operation of the preferred embodiment in the invention can best be seen viewing FIGS. 1, 2 and 3. With the press open and the moving plate 16 in its upward most position, the locking plates 80 and 80' respectively would be in their disengaged position from the grooved rod 60. The safety cylinders 108 would also be energized at this time. Upon closing the machine, the safety cylinders 108 would be energized to pull the blocking plate 116 from the interference with safety rod 100. The upper cylinder 52 via rod 56 would provide a rapid lowering of the upper moving plate 16 to its lowest most position. That position will be determined by the relative position of the downstroke stop 64 in the grooved rod 60 and the shim 66. Upon completion of its downstroke, the locking plates 80 and 80' would be moved into engaging position with slot 84 by cylinders 90 and 90'. The accurate positioning of these plates into the slot 84 on each of the four grooved load bearing rods 60 accurately locate the position of the upper section of the mold means 50. Upon completion of that step, the lower cylinders 38 are then energized and move the lower plate 14 and the mold into its engaging position and provide the lock up tonnage which is required for the process or operation. These lower cylinders are a large bore and short stroke cylinders so that large mechanical forces can be generated for such a machine with the added advantage that only a low volume of oil is needed for operation. The tonnage on a machine such as this would be approximately 1,100 tons, however, this shall not limit the size of press to which this invention could be used. It can easily be seen that the force exerted would be transmitted through the mold means 50, to plate 16, to rod 60, to locking plates 80 and 80' and hence to the upper plate 18 and the tie bar nuts 24.

Upon completion of the process or molding step, the lower cylinders 38 would be de-energized allowing the lower moving platen 14 to return to its lower most position. The locking plate cylinders 90 and 90' would be energized removing the locking plates 80 and 80' from their engaging position in slot 84 and cylinder 52 would then be energized to move the upper moving plate 16 into its upper most position so that the part can be removed from the mold means 50. Of course, the blocking cylinder 108 would be energized to move plate 116 into its safety position as shown in FIG. 5.

In summary, our invention consists of a grooved load bearing rod having accurately machined slots or grooves attached to the upper plate of a hydraulic press. The grooved rod passes through the upper fixed plate and has a downstroke ring means attached to one of the grooves to accurately position the upper moving plate of the press. A locking plate means is operatively connected to the upper plate so the locking plate means is positioned into a slot in the bearing rod. A shim means adjusts the parallelism between the moving plates so that the proper degree of accuracy is achieved.

It is evident that this same mechanism could be used to accurately locate a moving platen in a horizontal machine as well. It is also evident that our invention and disclosure can have variations and modifications which would meet the individual or particular needs to others who are skilled in the art and it is intended that those changes are covered by the embodiments of the claims appended herein.

I claim:

1. A hydraulic press for molding parts having a base support means with a first stationary plate means, a first movable plate, first cylinder means attached to said first movable plate and to said first stationary plate, a second stationary plate means having an inboard and an outboard face, a second movable plate, a second cylinder means attached to said second stationary plate means and to said second movable plate, column means affixed to said first stationary plate means and to said second stationary plate means, said first and second movable plates being guidingly supported by said column means during relative movement therebetween, adjustably positionable locking means operatively co-operating with said second stationary plate and said second movable plate wherein said locking means prevents movement of said first movable plate when the press is subjected to full press loading, said locking means including guide bushing means in said second stationary plate means, rod means affixed to said second movable plate and extends through said bushing means in said second stationary plate means having a plurality of spaced grooves formed therein at spaced increments along the length thereof and parallel to one another and to the inboard and outboard face of said second stationary plate means, adjustable stop means fixedly secured in one of said grooves at the outboard face of said second stationary plate means to limit movement of said first movable plate toward said second movable plate, and retractable locking plate means supported on the inboard face of said second stationary plate means selectively engageable with another of said grooves at the inboard face of said second stationary plate means when said stop means limits movement of said first movable plate whereby press loads produced by said second cylinder means are transferred through said rod means and said second stationary plate means so as to be assumed by said column means.

2. The apparatus of claim 1 wherein the stop means comprises a split ring collar engaging one of said grooves and a selected shim means interposed between said split ring and said second stationary plate means.

3. The apparatus of claim 1, further including safety rod means affixedly held to said first movable plate, means forming an opening in said second movable plate, said safety rod being selectively movable into and out of said opening during press operation and being located out of said opening during adjustment of said stop means, and blocking means to limit the downward movement of said second movable plate with said safety rod means when the press is in an unloaded open position.

4. The apparatus of claim 2 wherein the stop means comprises a split ring collar engaging one of said grooves and a selected shim means interposed between said split ring and said second stationary plate means.

* * * * *